US005298573A

United States Patent [19]
Senn

[11] Patent Number: 5,298,573
[45] Date of Patent: Mar. 29, 1994

[54] POLY(ARYLENE SULFIDE SULFONE)/POLY(ARYLENE SULFIDE KETONE) BLOCK COPOLYMERS AND PREPARATION THEREOF

[75] Inventor: Dwayne R. Senn, Bartlesville, Okla.

[73] Assignee: Phillips Petroleum Company, Bartlesville, Okla.

[21] Appl. No.: 976,237

[22] Filed: Nov. 13, 1992

[51] Int. Cl.⁵ .................. C08F 283/00; C08G 75/14
[52] U.S. Cl. ........................ 525/471; 525/537; 528/388
[58] Field of Search .................. 525/471, 537

[56] References Cited

U.S. PATENT DOCUMENTS

| | | | |
|---|---|---|---|
| 4,008,203 | 2/1977 | Jones | 260/49 |
| 4,895,892 | 1/1990 | Satake et al. | 524/520 |
| 4,960,841 | 10/1990 | Kawabata et al. | 525/537 |
| 4,975,479 | 12/1990 | Satake et al. | 525/471 |

FOREIGN PATENT DOCUMENTS 41320  8/1988  Japan ........................ 75/2

Primary Examiner—John C. Bleutge
Assistant Examiner—Helen F. Lee
Attorney, Agent, or Firm—Marianne H. Michel

[57] ABSTRACT

A process is provided for preparing poly(arylene sulfide sulfone)/poly(arylene sulfide ketone) block copolymers comprising: contacting poly(arylene sulfide sulfone) prepolymer, at least one dihalobenzophenone, a sulfur source, and a polar organic compound under polymerization conditions.

6 Claims, No Drawings

POLY(ARYLENE SULFIDE SULFONE)/POLY(ARYLENE SULFIDE KETONE) BLOCK COPOLYMERS AND PREPARATION THEREOF

BACKGROUND OF THE INVENTION

This invention relates to the preparation of poly(arylene sulfide sulfone)/poly(arylene sulfide ketone) block copolymers and the block copolymers thus produced.

Poly(arylene sulfide sulfone)s are amorphous polymers and exhibit good impact strength, a relatively low melting temperature which give a moderate processing temperature, and a high glass transition temperature which allows the polymer to be used at high temperatures. They are useful in the such areas as electrical components, wire coatings, automotive parts, and the like.

Poly(arylene sulfide ketone)s are an important class of engineering thermoplastics. They are of commercial interest for film, fiber, moldings, and composite applications because of their high melting points giving the polymer the ability to withstand high temperatures, and crystallinity which produces a polymer with very good chemical resistance.

It would be desirable to produce a polymer composition which exhibits the advantages of both poly(arylene sulfide sulfone)s and poly(arylene sulfide ketone)s i.e. heat stability, chemical resistance, high impact strength, reduced processing temperature, and high glass transition temperature.

SUMMARY OF THE INVENTION

Objects of the present invention are, therefore, to provide a process for preparing poly(arylene sulfide sulfone)/poly(arylene sulfide ketone) block copolymers and the block copolymers thus produced.

In accordance with this invention a process for preparing poly(arylene sulfide sulfone)/poly(arylene sulfide ketone) block copolymers is provided which comprises contacting poly(arylene sulfide sulfone) prepolymer, at least one benzophenone, a sulfur source, and a polar organic compound under polymerization conditions.

DETAILED DESCRIPTION OF THE INVENTION

Poly(arylene sulfide sulfone) prepolymer is prepared by contacting at least one dihaloaromatic sulfone, a polar organic compound, and a sulfur source under polymerization conditions. The prepolymer can then be contacted with at least one dihalobenzophenone, a sulfur source, and a polar organic compound under polymerization conditions. In the alternative, prior to contacting with at least one dihalobenzophenone, a sulfur source, and a polar organic compound, the prepolymer can be isolated, and optionally washed and dried.

Dihaloaromatic sulfones employed in the preparation of the poly(arylene sulfide sulfone) prepolymer can be represented by the formula

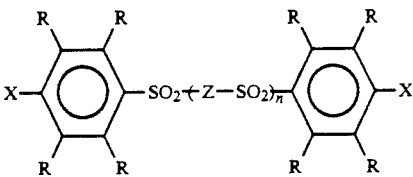

where each X is selected from the group consisting of fluorine, chlorine, bromine, and iodine; Z is a divalent radical selected from the group consisting of

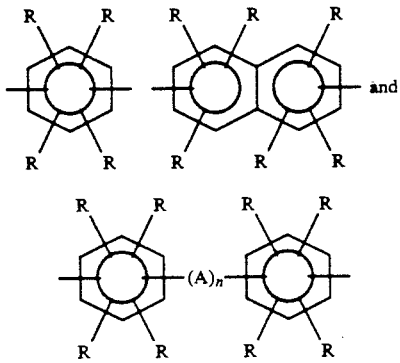

where each n is 0 or 1; A is selected from the group consisting of oxygen, sulfur, sulfonyl, and $CR_2$; and each R is selected from the group consisting of hydrogen and alkyl radicals having 1 to 4 carbon atoms, the total number of carbon atoms in all the R groups in the molecule being 0 to 12. Preferably n is 0.

Examples of suitable dihaloaromatic sulfones that can be employed in the preparation of the poly(arylene sulfide sulfone) prepolymer include bis(p-fluorophenyl)sulfone; bis(p-chlorophenyl)sulfone; bis(p-bromophenyl)sulfone; bis(p-iodophenyl)sulfone; p-chlorophenyl p-bromophenylsulfone; p-iodophenyl 3-methyl-4-flurophenyl sulfone; bis(2-methyl-4-chlorophenyl)sulfone; bis(2,5-diethyl-4-bromophenyl)sulfone; bis(3-isopropyl-4-iodophenyl)sulfone; bis(2,5-dipropyl-4-chlorophenyl)sulfone; bis(2-butyl-4-fluorophenyl)sulfone; bis(2,3,5,6-tetramethyl-4-chlorophenyl)sulfone; 2-isobutyl-4-chlorophenyl 3'-butyl-4'-bromophenyl sulfone; 1,4-bis(p-chlorophenyl-sulfonyl)benzene; 1-methyl-2,4-bis(p-fluorophenylsulfonyl)benzene; 2,6-bis(p-bromophenylsulfonyl)naphthalene; 7-ethyl-1,5-bis(p-iodophenylsulfonyl)naphthalene; 4,4'-bis(p-chlorophenylsulfonyl)biphenyl; bis[p-(p-bromophenylsulfonyl)phenyl]ether; bis[p-(p-chlorophenylsulfonyl)phenyl]sulfide; bis[p-(p-chlorophenylsulfonyl]sulfone; bis[p-(p-bromophenylsulfonyl)phenyl]methane; 5,5-bis[3-ethyl-4-(p-chlorophenylsulfonyl)phenyl]nonane, and the like, and mixtures thereof. The presently preferred dihaloaromatic sulfones are p-dichloroaromatic sulfones and bis(p-chlorophenyl)sulfone is most preferred.

Generally, in preparing the poly(arylene sulfide sulfone) prepolymer, the amount of dihaloaromatic sulfone employed is in the range of 0.7 to 2.0 moles per mole of sulfur source.

The sulfur source which is typically used in preparing the poly(arylene sulfide sulfone) prepolymer is an alkali metal sulfide or an alkali metal hydrosulfide. Examples of sulfur sources than can be employed in the preparation of the poly(arylene sulfide sulfone) prepolymer include lithium sulfide, sodium sulfide, potassium sulfide, rubidium sulfide, cesium sulfide, lithium hydrosulfide, sodium hydrosulfide, potassium hydrosulfide, rubidium hydrosulfide, cesium hydrosulfide, and mixtures thereof. The alkali metal sulfide can be used in anhydrous form, or preferably as a hydrate, or as an aqueous mixture. Sodium sulfide or sodium hydrosulfide are preferred.

When alkali metal hydrosulfides are employed, it is preferable that a base is present. Suitable bases include alkali metal hydroxides, alkali metal carbonates and mixtures thereof. Examples of bases which can be employed include lithium hydroxide, sodium hydroxide, potassium hydroxide, sodium carbonate, potassium carbonate, rubidium carbonate, cesium carbonate and mixtures thereof. Sodium hydroxide or sodium carbonate are preferred.

If a base is employed, the moles of base per mole of alkali metal hydrosulfide is generally in the range of from about 0.5 to about 4.0 moles of base per mole of sulfur source and preferably from 0.5 to 2.0 moles of base per mole of sulfur source.

The polar organic compounds used in preparing the poly(arylene sulfide sulfone) prepolymer should be substantially liquid at the reaction temperatures and pressures employed. The polar organic compounds can be cyclic or acyclic and generally have 1 to 18 carbon atoms per molecule. Suitable polar organic compounds include organic amides, lactams, ureas and sulfones such as formamide, acetamide, N-methylformamide, N,N'-dimethylformamide, N,N'-diemthylacetamide, N-ethylproionamide, N,N'-dipropylbutyramide, 2-pyrrolidone, N-methyl-2-pyrrolidone (NMP), ε-caprolactam, N-methyl-ε-caprolactan, N,N'-ethylenedi-2-pyrrolidone, hexamethylphosphoramide, tetramethylurea, sulfalone, diphenyl sulfone, and the like and mixtures thereof. Amides are preferred, and N-methyl-2-pyrrolidone is especially preferred.

The moles of polar organic compound per mole of sulfur source can vary broadly, generally from about 1 to about 24, preferably from 2 to 16, and most preferably from 2 to 12.

Optionally an alkali metal carboxylate can be employed in the preparation of the poly(arylene sulfide sulfone) prepolymer. The presence of an alkali metal carboxylate generally results in an poly(arylene sulfide sulfone) prepolymer of higher molecular weight than polymers prepared in the absence of alkali metal carboxylate.

Alkali metal carboxylates that can be employed in the preparation of the prepolymer can be represented by the formula $R'(CO_2M)_m$ where $R'$ is a hydrocarbyl radical selected from alkyl, cycloalkyl, aryl, and alkaryl, said hydrocarbyl radical having 1 to 20 carbon atoms, M is an alkali metal selected from the group consisting of lithium, sodium, potassium, rubidium, and cesium, and m is 1 or 2. Preferably, $R'$ is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed in the preparation of the poly(arylene sulfide sulfone) prepolymer include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium butanedioate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

When employed, the moles of alkali metal carboxylate per mole of sulfur source can vary broadly, generally in the range of from about 0.05 to about 4, preferably from about 0.1 to about 2, and most preferably from 0.15 to 1.5.

Although the reaction temperature at which the prepolymerization is conducted can vary over a considerable range, generally it will be within the range of from about 150° C. to about 300° C., and most preferably from 175° C. to 275° C. The reaction time can vary widely, depending in part on the reaction temperature, but generally will be within the range of from about 10 minutes to about 5 hours, preferably from 10 minutes 3 hours. The pressure will generally be within the range of about 0 psig to about 300 psig (0–2.1 MPa), preferably 100 psig to about 250 psig (0.7–1.7 MPa).

The poly(arylene sulfide sulfone) prepolymer can be separated from the reaction mixture of the prepolymer and reaction mixture can be retained in the reactor and subsequently contacted with a dihalobenzophenone, a sulfur source, and a polar organic compound. If the poly(arylene sulfide/sulfone) prepolymer is separated from the reaction mixture, any method known to those of ordinary skill in the art can be employed. One suitable method employs the addition of a separation agent, such as water, in order to separate the prepolymer from the polar organic compound and non-polymeric liquid components and unconsumed reactants. The prepolymer can then be washed with water and optionally water-miscible solvents such as acetone or methanol in order to remove impurities and by-product salts.

The dihalobenzophenones which can be employed in the preparation of the poly(arylene sulfide sulfone)/(poly(arylene sulfide ketone) block copolymer are represented by the formula

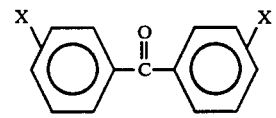

wherein each X is selected from the group of chlorine, bromine, fluorine, and iodine.

Examples of dihalobenzophenones suitable for preparing the prepolymer include 4,4'-dichlorobenzophenone, 4,4'-dibromobenzophenone, 4,4'-difluorobenzophenone, 4,4'-diiodobenzophenone, 2,4'-dichlorobenzophenone, 2,4'-dibromobenzophenone, 2,4'-difluorobenzophenone, 2,4'-diiodobenzophenone, and the like, and mixtures thereof. The presently preferred dihalobenzophenones are dichlorobenzophenones and 4,4'-dichlorobenzophenone is most preferred.

Generally, in preparing the block copolymers, the amount of dihalobenzophenone employed is in the range of 0.7 to 2.0 moles per mole of sulfur source. The amount of dihalobenzophenone relative to the poly(arylene sulfide sulfone) prepolymer can vary widely depending on the characteristic desired in the final block copolymer. Generally the amount of dihalobenzophenone is in the range of from about 0.01 moles to about 100 moles of dihalobenzophenone per mole of poly(arylene sulfide sulfone) prepolymer. Preferably the molar ratio of dihalobenzophenone relative to the poly(arylene sulfide sulfone) prepolymer is in the range of from about 0.35 moles to about 100 moles of dihalobenzophenone per mole of poly(arylene sulfide sulfone) prepolymer.

Sulfur sources which can be employed in the preparation of the poly(arylene sulfide sulfone)/poly(arylene sulfide ketone) block copolymer are those described above in the preparation of the poly(arylene sulfide sulfone) prepolymer. The sulfur source can be the same or different from the sulfur source employed in preparing the poly(arylene sulfide sulfone) prepolymer. The preferred sulfur sources ar sodium sulfide or sodium hydrosulfide.

The polar organic compounds used in preparing the poly(arylene sulfide sulfone)/poly(arylene sulfide ketone) block copolymers are those described above in the preparation of the poly(arylene sulfide sulfone) prepolymer. The polar organic compounds can be the same or different from those employed in preparing the poly(arylene sulfide sulfone) prepolymer. Amides are preferred, and N-methyl-2-pyrrolidone is especially preferred.

The moles of polar organic compound per mole of sulfur source can vary broadly, generally from 1 to about 24, preferably from 2 to 16, and most preferably from 2 to 12.

Optionally an alkali metal carboxylate can be employed in the preparation of the poly(arylene sulfide sulfone)/poly(arylene sulfide ketone) block copolymers. Usage of an alkali metal carboxylate generally results in a copolymer of higher molecular weight than copolymers prepared in the absence of alkali metal carboxylate.

Alkali metal carboxylates that can be employed in the preparation of the block copolymer can be the same or different from those in the prepolymerization step. The presently preferred alkali metal carboxylate is sodium acetate because of its effectiveness and commercial availability.

The moles of alkali metal carboxylate per mole of sulfur source can vary broadly, generally in the range of from about 0.05 to about 4, preferably from about 0.1 to about 2, and most preferably from 0.15 to 1.5.

Although the reaction temperature at which the copolymerization is conducted can vary over a considerable range, generally it will be within the range of about 150° C. to about 350° C., preferably 175° C. to 275° C. The reaction time can vary widely, depending in part on the reaction temperature, but generally will be within the range of from about 10 minutes to about 72 hours, preferably from 1 hour to 8 hours. The pressure will generally be within the range of about 0 psig to about 300 psig (0–2.1 MPa), preferably 100 psig to about 250 psig (0.7–1.7 MPa).

The block copolymers can be separated from their reaction mixture in any manner known to those of ordinary skill in the art. One suitable method employs the addition of a separation agent, such as water, in order to separate the polymer from the polar organic compound and non-polymeric liquid components and unconsumed reactants. The polymer can then be washed with water and optionally water-miscible solvents such as acetone or methanol in order to remove impurities and by-product salts. If desired, at least a portion of the washing can be conducted at an elevated temperature, for example up to about 200° C.

The final recovered poly(arylene sulfide ketone)/poly(arylene sulfide sulfone) block copolymer can optionally have other ingredients incorporated including extenders, fillers, pigments, plasticizers, stabilizers etc. In certain applications, it may be desirable to add additional strength to the polymer. Polymer strength can be increased by incorporating strengtheners such as fibers into the polymer to form a composite material. Preferred strengtheners, due to their effectiveness, are inorganic fibers such as asbestos, glass and carbon and the like. The polymers produced by the process of the invention are useful in the production of coatings, film, molded objects, and fibers. The copolymers are also useful as compatibilizers in polymer blends.

The following example will serve to show the present invention in detail by way of illustration and not by way of limitation.

EXAMPLE

The following example demonstrates the preparation and thermal transition properties of various polymers. Poly(phenylene sulfide sulfone)/poly(phenylene sulfide ketone) block copolymers (PPSS/PPSK) were prepared using PPSS prepolymer and varying amounts of monomers. The PPSS prepolymer was prepared in situ, Runs 104–107, and as an isolated prepolymer, Runs 108–111. Except where noted, polymerizations were carried out in one-liter stainless steel autoclave reactors equipped with anchor type stirrer.

PPSS polymer, Run 101, was prepared by charging a two-gallon stainless steel stirred autoclave reactor with 380.2 g (4.00 mol) as an aqueous solution containing 58.98 weight percent NaSH; 1160.17 g (4.04 mol) bis(4-chlorophenyl)sulfone (BCPS); 1130.56 g (10.67 mol) sodium carbonate; 328.12 g (4.00 mol) sodium acetate; 108.00 g (6.00 mol) deionized water; and 1586.1 g (16.00 mol) N-methyl-2-pyrrolidone (NMP). The reactor was sealed and purged four times with nitrogen. The agitator rate was adjusted to 600 rpm. The temperature raised to 200° C. and held for 3 hours. The reaction was quenched by adding 300–400 mL water while maintaining the temperature of the reaction mixture at or above 180° C. The reactor was cooled by forcing air through the cooling coils overnight. The solid product was recovered and washed with hot deionized water until the filtrate was clear, then with 3 L deionized water at 180° C. for 30 minutes, filtered and dried. The polymer was dried in a vacuum oven at 150° C.

PPSK polymer, Run 102, was prepared by charging a two-gallon stainless-steel reactor with 2.01 mol NaSH as an aqueous mixture containing 59.15 wt % NaSH; 2.15 moles water; 2.00 moles sodium hydroxide; 2.00 moles 4,4'-dichlorobenzophenone (DCBP); and 24.00 moles N-methyl-2-pyrrolidone. The reactor was sealed and purged with nitrogen and the temperature raised to 250° C. and held for one hour. The reactor was cooled to 160° C. and water was distilled out through a condenser fitted to the reactor. During the dehydration, the temperature was gradually increased to 200° C. The reactor was then charged with 36 mL of water. The reactor was heated to 250° C. and held for two hours. Polymerization was completed at 270° C. for 30 minutes, then allowed to cool over night. The polymer was suspended in tap water and collected by filtration. Following three cold water washings, the polymer was washed with 1 weight percent sodium hydroxide at 120° C. and filtered. After a cold water wash the polymer was washed in 5 weight percent calcium chloride at 185° C. for 30 minutes. The polymer was filtered and given several cold water washings and dried in a forced air oven at 100° C. for 6 hours. The yield was 94%.

Random PPSS/PPSK copolymer, Run 103, was prepared by charging the reactor with 198.27 g (2.000 mol) NMP; 23.893 g (0.250 mol) NaSH as an aqueous mixture containing 59.15 wt % NaSH; 52.995 g (0.500 mol) Na$_2$CO$_3$; 20.509 g (0.250 mol) sodium acetate (NaOAc); 35.90 g (0.125 mol) bis(4-chlorophenyl)sulfone (BCPS); 31.39 g (0.125 mol) 4,4'dichlorobenzophenone (DCBP); and 30.54 g (2.351 total mol) H$_2$O. The reactor was sealed and purged four times with nitrogen and the temperature raised to 200° C. which gave a pressure of 175 psig and held for 3 hours. The reactor was cooled by running water through the cooling coils until the reactor reached 35° C. The solid product was recovered and washed twice with hot water, then with hot 3 wt. % acetic acid, and then with hot water. The solid product was then rinsed with acetone followed by a hot water rinse. The polymer was then dried in a vacuum oven at 150° C.

In Runs 104-107, PPSS/PPSK block copolymers were prepared using in situ PPSS prepolymer. The in situ PPSS prepolymer was prepared by charging the reactor with 99.13 g (1.000 mol) NMP; 11.85 g (0.125 mol) NaSH as an aqueous mixture containing 59.15 wt % NaSH; 26.50 g (0.250 mol) Na$_2$CO$_3$; 10.25 g (0.125 mol) sodium acetate (NaOAc); 35.90 g (0.125 mol) bis(4-chlorophenyl)sulfone (BCPS); and 35.81 g (1.988 mol) H$_2$O. The reactor was sealed and purged four times with nitrogen and the temperature raised to 190° C. which gave a pressure of 120 psig and held for 30 minutes. The reactor was cooled with ice and water was run through the cooling coils until the reactor reached 35° C. The reactor was then charged with 99.13 g (1.000 mol) N-methyl-2-pyrrolidone; 11.85 g (0.125 mol) NaSH as an aqueous mixture containing 59.15 wt % NaSH; 26.500 g (0.250 mol) Na$_2$CO$_3$; a predetermined amount 4,4'-dichlorobenzophenone (DCBP); and 15.21 g (1.175 total mol) H$_2$O. The reactor was purged four times with nitrogen and heated to 200° C. giving a pressure of 175 psig. The temperature and pressure were held for 2 hours. The reactor was cooled by running water through the cooling coils. The solid product was recovered and washed twice with hot water, then with hot 3 wt. % acetic acid, and then with hot water. The solid product was then rinsed with acetone followed by a hot water rinse. The polymer was then dried in a vacuum oven at 150° C.

In Runs 108-111, PPSS/PPSK block copolymers were prepared by contacting isolated PPSS prepolymer and DCBP. The isolated PPSS prepolymer was prepared by charging a one-liter reactor with 99.13 g (1.000 mol) NMP; 11.85 g (0.125 mol) NaSH as an aqueous mixture containing 59.15 wt % NaSH; 26.50 g (0.250 mol) Na$_2$CO$_3$; 10.25 g (0.125 mol) sodium acetate (NaOAc); 35.90 g (0.125 mol) bis(4-chlorophenyl)sulfone (BCPS); and 35.81 g (1.988 mol) H$_2$O. The reactor was sealed and purged four times with nitrogen and the temperature raised to 190° C. which gave a pressure of 120 psig and held for 30 minutes. The reactor was cooled by running water through the cooling coils until the reactor reached 35° C. The solid product was recovered and washed twice with hot water, then with hot 3 wt. % acetic acid, and then with hot water. The solid product was then rinsed with acetone followed by a hot water rinse. The PPSS prepolymer was then dried in a vacuum oven at 150° C. Subsequently, a one-liter reactor was charged with 297.40 g (3.00 mol) N-methyl-2-pyrrolidone; 11.73 g (0.1238 mol) NaSH as an aqueous mixture containing 59.15 wt % NaSH; 26.50 g (0.2500 mol) Na$_2$CO$_3$; a predetermined amount of PPSS prepolymer ranging from 0.125-0.186 moles; a predetermined amount of 4,4'-dichlorobenzophenone (DCBP) ranging from 0.0625-0.125 moles; and 14.92 g (1.1561 total mol) H$_2$O. The reactor was purged four times with nitrogen and heated to 200° C. giving a pressure of 175 psig. The temperature and pressure were held for 2 hours. The reactor was cooled by running water through the cooling coils. The solid product was recovered and washed twice with hot water, then with hot 3 wt. % acetic acid, and then with hot water. The solid product was then rinsed with acetone followed by a hot water rinse. The polymer was then dried in a vacuum oven at 150° C. Polymer was recovered and the yield ranged from viscometer using a 0.5 weight percent solution in concentrated sulfuric acid as solvent ranged from 0.25 dL/g to 0.33 dL/g.

Thermal transitions were measured employing a Perkin-Elmer DAC-2C differential scanning calorimeter equipped with a computerized data system and a Perkin-Elmer TADS-1 plotter. The polymer sample was heated at a rate of 20° C./minute. In Table 1, Tg is the glass transition temperature in °C. Tcc is the cold crystallization temperature in °C. Tmc is the melt crystallization temperature (upon cooling of the melt at 20° C./minute) in °C. Tm is the melt temperature in °C.

In the following examples, the melt flow values were determined by the method ASTM D 1238-86, modified to use preheat times of five minutes at a temperature of 343° C. Melt flow values are reported in grams per ten minutes (g/10 min.).

Polymer composition, melt flow, and thermal transitions of the various polymers prepared are indicated in Table 1. Polymer composition represents the molar ratio of PPSS/PPSK based on the moles of sulfone (monomer or prepolymer) to moles of benzophenone present in the reaction.

TABLE 1

| Run | Polymer Composition | MF g/10 min. | Tg °C. | Tcc °C. | Tmc °C. | Tm °C. |
|---|---|---|---|---|---|---|
| 101 | PPSS | 3 | 220 | — | — | — |
| 102 | PPSK | 30 | 145 | 185 | 300 | 348 |
| | PPSS/PPSK random copolymer | | | | | |
| 103 | 50/50 | 44 | 179 | — | — | — |
| | PPSS/PPSK block copolymer from in situ PPSS prepolymer | | | | | |
| 104 | 50/50 | 651 | 161 | 215 | 254 | 294 |
| 105 | 50/50 | 947 | 159 | 216 | 251 | 295 |
| 106 | 75/25 | 87 | 192 | — | — | — |
| 107 | 85/15 | 34 | 205 | — | — | — |
| | PPSS/PPSK block copolymer from isolated PPSS prepolymer | | | | | |
| 108 | 50/50 | 40 | 177 | — | — | — |
| 109 | 50/50 | 228 | 175 | — | — | — |
| 110 | 75/25 | 0 | 196 | — | — | — |

TABLE 1-continued

| Run | Polymer Composition | MF g/10 min. | Tg °C. | Tcc °C. | Tmc °C. | Tm °C. |
|---|---|---|---|---|---|---|
| 111 | 75/25 | 133 | 193 | — | — | — |

The results in Table 1 demonstrate that a crystalline or amorphous block copolymer can be prepared by contacting a poly(phenylene sulfide sulfone) prepolymer, 4,4'-dichlorobenzophenone, sodium hydrosulfide, and N-methyl-2-pyrrolidone. The 50/50 PPSS/PPSK block copolymer prepared from in situ prepolymer was crystalline in form. The 75/25 and 85/15 PPSS/PPSK block copolymers exhibited higher glass transition temperature and were amorphous. The 50/50 PPSS/PPSK block copolymer prepared from isolated prepolymer was also amorphous.

While this invention has been described in detail for the purpose of illustration, it is not to be construed as limited thereby, but is intended to cover all changes and modifications within the spirit and scope thereof.

That which is claimed is:

1. A process for preparing poly(arylene sulfide sulfone)/polyarylene sulfide ketone) block copolymers consisting essentially of:

reacting a mixture consisting essentially of a poly(phenylene sulfide sulfone) prepolymer, 4,4'-dichlorobenzophenone, sodium hydrosulfide, sodium acetate, and N-methyl-2-pyrrolidone under polymerization conditions;

wherein said prepolymer is prepared by reacting a mixture consisting essentially of bis(p-chlorophenyl)sulfone, sodium hydrosulfide, sodium carbonate, and N-methyl-2-pyrrolidone under polymerization conditions prior to said contacting with said 4,4'-dichlorobenzophenone;

wherein said 4,4'-dichlorobenzophenone is present in an amount in the range of from 0.35 to 100 moles per mole of poly(phenylene sulfide ketone).

2. A process according to claim 1 further comprising recovering said prepolymer under polymerization conditions prior to said contacting with said 4,4'-dichlorobenzophenone.

3. A process according to claim 1 wherein said polymerization conditions for preparing said prepolymer include a temperature in the range of from about 150° C. to about 300° C. and for a time of about 10 minutes to about 5 hours.

4. A process according to claim 3 wherein said polymerization conditions include a temperature in the range of from 175° C. to about 275° C.

5. A block copolymer produced according to the process of claim 1.

6. A block copolymer produced according to the process of claim 2.

* * * * *